United States Patent [19]

Seiver et al.

[11] Patent Number: 4,540,482
[45] Date of Patent: Sep. 10, 1985

[54] SUPPORTED CARBON-CONTAINING MOLYBDENUM AND TUNGSTEN SULFIDE CATALYSTS, THEIR PREPARATION AND USE

[75] Inventors: Robert L. Seiver, Baton Rouge, La.; Russell R. Chianelli, Sommerville, N.J.

[73] Assignee: Exxon Research and Engineering Co., Florham Park, N.J.

[21] Appl. No.: 551,675

[22] Filed: Nov. 14, 1983

Related U.S. Application Data

[62] Division of Ser. No. 400,005, Jul. 20, 1982, Pat. No. 4,430,443.

[51] Int. Cl.$^3$ .................. C10G 45/04; C10G 45/08
[52] U.S. Cl. .............................. 208/215; 208/216 R; 208/254 H
[58] Field of Search ........... 208/108, 112, 215, 216 R, 208/251 H, 254 H

[56] References Cited

U.S. PATENT DOCUMENTS

| | | | |
|---|---|---|---|
| 2,112,292 | 3/1938 | Jones | 423/55 |
| 2,490,488 | 12/1949 | Stewart | 502/220 |
| 2,686,763 | 8/1954 | Johnson et al. | 502/26 |
| 3,331,769 | 7/1967 | Gatsis | 208/210 |
| 3,876,755 | 4/1975 | Kurtak et al. | 423/517 |
| 4,066,530 | 1/1978 | Aldridge et al. | 208/112 |
| 4,098,839 | 7/1978 | Wilms et al. | 502/220 |
| 4,134,825 | 1/1979 | Bearden et al. | 208/108 |
| 4,243,553 | 1/1981 | Naumann et al. | 502/220 |
| 4,243,554 | 1/1981 | Naumann et al. | 502/220 |

FOREIGN PATENT DOCUMENTS 1473900  3/1967  France .
7603197  3/1976  Netherlands .

OTHER PUBLICATIONS

Thermal Decomposition of $(NH_4)_2MoO_2S_2$, T. P. Prasad et al, J. Eng. Chem., 1973, vol. 35, pp. 1845-1904.
Mills & Steffgen, Cat. Rev. 8, 159 (1973).
Noble Metals, Mo & W in Hydrocarbon Synthesis, J. F. Shultz et al, Report 6947, Jul. 1967.
Angrew, Chem. Int. Ed. Engl., 17, 279 (1978).
Konings et al., "Hydrodesulfurization Catalysts . . . ", J. Catalysis, 76, 466–472 (1982).

Primary Examiner—D. E. Gantz
Assistant Examiner—O. Chaudhuri
Attorney, Agent, or Firm—Llewellyn A. Proctor

[57] ABSTRACT

A supported carbon-containing molybdenum sulfide and tungsten sulfide catalyst useful for conducting methanation and hydrotreating reactions, principally the latter, can be formed by compositing a preselected quantity of a porous, refractory inorganic oxide with a complex salt characterized by the formula $$B_x[M_yS_{4-y}]$$

where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3, and heat decomposing the salt of said catalyst precursor composite in the presence of hydrogen sulfide and hydrogen to form said supported carbon-containing molybdenum sulfide or tungsten sulfide catalyst.

10 Claims, 1 Drawing Figure

LEGEND
○ CATALYST X   HDS
▽ CATALYST Z   ACTIVITY
◇ CATALYST H   78
□ CATALYST J   35

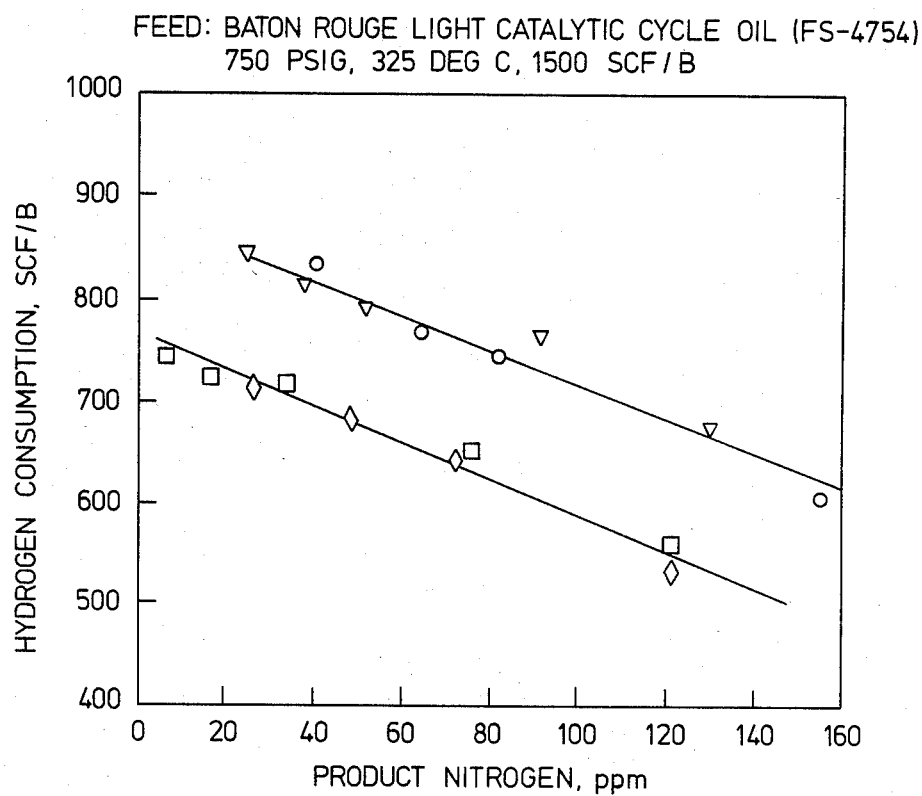

SUPPORTED CARBON-CONTAINING MOLYBDENUM AND TUNGSTEN SULFIDE CATALYSTS, THEIR PREPARATION AND USE

This is a division, of application Ser. No. 400,005 filed 7/20/82, now U.S. Pat. No. 4,430,443.

BACKGROUND OF THE INVENTION (1) Field of the Invention

This invention relates to a process for the preparation of supported carbon-containing molybdenum and tungsten sulfide catalysts, the supported catalyst species prepared by such process, and to the use of such catalysts in methanation or hydrotreating. In particular, it relates to a process for the preparation of a species of highly active, highly selective supported, metal-promoted hydrotreating catalysts, the catalyst species prepared by such process, and the use of such catalyst species in conducting methanation and hydrotreating processes, particularly the latter.

(2) Background and Prior Art

Hydrotreating processes are basic, and very well known to the petroleum refining industry. These processes require the treating with hydrogen of various hydrocarbon fractions, or whole heavy feeds, or feedstocks, in the presence of hydrogenation (hydrogen transfer) catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrofining relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrogenation. Carbon yield is reduced, and gasoline yield is generally increased. In the hydrodesulfurization of heavier feedstocks, or residuas, the sulfur compounds are hydrogenated and cracked. Carbon-sulfur bonds are broken, and the sulfur for the most part is converted to hydrogen sulfide which is removed as a gas from the process. Hydrodenitrogenation, to some degree also generally accompanies hydrodesulfurization reactions. In the hydrodenitrogenation of heavier feedstocks, or residuas, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock which is usually converted to lower molecular weight, or lower boiling components. In the hydrodenitrogenation of relatively heavy feedstocks emphasis is on the removal of nitrogen from the feedstock, which also is converted to lower molecular weight, or lower boiling components. Albeit, hydrodesulfurization and hydrodenitrogenation reactions generally occur together, it is usually far more difficult to achieve effective hydrodenitrogenation of feedstocks than hydrodesulfurization of feedstocks.

The dwindling supplies of high grade petroleum feedstocks necessitates the increased production and processing of transportation fuels from lower grade, heavy petroleum feedstocks and synthetic liquid hydrocarbons derived from hydrocarbon-containing, or precursor hydrocarbon-containing, solids. The refiners' feedstock sources as a result thereof continue to change, particularly as the worldwide supplies of petroleum diminish. The newer feedstocks often contain higher amounts of nitrogen, sulfur, and other materials. Nonetheless, whatever the difficulties, it remains a necessity to effectively hydrotreat the new feedstocks; often to a greater extent than previously was required. It has thus become necessary to process whole heavy petroleum crudes and residua from unconventional sources, as well as synthetic fuels (syncrudes; e.g. liquified coal, oil from coal carbonization, oil from tar sands, shale oil and the like inclusive of residua or viscous syncrude fractions). All, particularly the later, are under active consideration as commercial feedstocks, or feedstock replacements for higher grade petroleum sources. Feedstocks derived from these sources are often of high olefinic content, contain more sulfur or nitrogen, or both, than feedstocks derived from more conventional crude oils.

Naphthas, notably those derived from syncrudes, viz. residua, shale oil, and coal, are highly unsaturated and contain considerably more sulfur, nitrogen, olefins, and condensed ring compounds than the more conventional naphthas. For example, nitrogen and sulfur are contained in cat naphtha in concentrations ranging upwardly from 50 ppm and 1000 ppm, respectively. In coal liquids nitrogen and sulfur are present in concentrations ranging upwardly from 1300 ppm and 5000 ppm, respectively; and oxygen is presently in even higher concentrations. These compounds cause activity suppression and an all too rapid deactivation of the catalysts. Coke formation is increased, and there is more cracking with increased gas production. Albeit these compounds, except for condensed ring naphthenic compounds, can be removed by conventional hydrofining, this is a severe, if not an intolerable process burden due to the large hydrogen consumption; and hydrogen becomes more and more a very expensive commodity. Thus, generally considerably more upgrading is required to obtain usable products from these sources. Such upgrading generally necessitates hydrotreating the various hydrocarbon fractions, or whole crudes, and includes reactions such as hydrogenating to saturate olefins and aromatics, hydrodesulfurizing to remove sulfur compounds, hydrodenitrogenating to remove nitrogen, and conversion of high boiling compounds to lower boiling compounds.

Typical hydrotreating catalysts are exemplified by cobalt molybdate on alumina, nickel molybdate on alumina, cobalt molybdate promoted with nickel, and the like. Certain transition metal sulfides such as cobalt and molybdenum sulfides and mixtures thereof have also been employed in hydrofining processes for upgrading oils which contain sulfur and nitrogen compounds. For example, U.S. Pat. No. 2,914,462 discloses the use of molybdenum sulfide for hydrodesulfurizing gas oil and U.S. Pat. No. 3,148,135 discloses the use of molydenum sulfide for hydrorefining sulfur and nitrogen-containing hydrocarbon oils. U.S. Pat. No. 2,715,603 discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. A serious disadvantage associated with the use of such catalysts is their relatively high cost, and the supply of catalytic metals is rather limited. Moreover, the reaction rates of such catalysts are relatively slow, particularly in the presence of nitrogen; and hydrogen consumption is quite high. These latter problems are particularly oppressive when it is realized that new generation feeds are unusually high in nitrogen, or sulfur, or both, and the cost of hydrogen is increasing at very high rates.

Molybdenum sulfide is also known to be useful for water gas shift and methanation reactions, as well as for catalyzed hydrotreating operations. Recently, e.g., it was disclosed in U.S. Pat. Nos. 4,243,553 and 4,243,554 that molybdenum disulfide catalysts of relatively high surface area can be obtained by thermally decomposing selected thiomolybdate salts at temperatures ranging from 300°–800° C. in the presence of essentially inert, oxygen-free atmospheres, e.g., atmospheres of reduced pressure, or atmospheres consisting of argon, nitrogen, and hydrogen, or mixtues thereof. In accordance with the former, a substituted ammonium thiomolybdate salt is thermally decomposed at a very slow heating rate of from about 0.5 to 2° C./min, and in accordance with the latter an ammonium thiomolybdate salt is decomposed at a rate in excess of 15° C. per minute to form the high sulface area molybdenum disulfide.

There remains a need in the art for new, improved hydrotreating catalysts, especially hydrotreating catalysts which are more highly active, selective, and stable. It is accordingly a primary objective of the present invention to provide this need, particularly by providing new and improved hydrotreating catalysts, a process for the preparation of these catalysts, and process for the use of these catalysts in conducting hydrotreating reactions.

A particular object is to provide novel hydrogen efficient hydrotreating catalysts which are especially active for the hydrodesulfurization, or hydrodenitrogenation, or both, of hydrocarbon feedstocks which contain relatively high concentrations of sulfur, or nitrogen, or both; as well as a process for the use of such catalysts in conducting such reactions.

A further, and more particular object is to provide novel hydrotreating catalysts of such character which are highly selective for conducting hydrodesulfurization, or hydrodenitrogenation reactions, or both; as well as a process for the use of such catalysts in conducting such reactions.

A yet further, and more specific object is to provide novel methanation catalysts, a process for the preparation of such catalysts, and a process for the use of such catalysts in conducting methanation reactions.

BRIEF DESCRIPTION OF THE FIGURE

The FIGURE is a plot of hydrogen consumption vs. Product nitrogen resulting in the hydrotreatment of Baton Rouge Light Catalytic Cycle Oil.

DESCRIPTION OF THE INVENTION

These and other objects are achieved in accordance with the present invention embodying catalysts, and process for producing such supported carbon-containing molybdenum and tungsten sulfide hydrotreating catalysts, both promoted and unpromoted species, which have admirably high activity, selectivity, and stability especially in conducting hydrodesulfurization and hydrodenitrogenation reactions at high levels of hydrogen efficiency with various sulfur and nitrogen containing hydrocarbon feeds. In accordance therewith, a supported carbon-containing molybdenum sulfide and tungsten sulfide hydrotreating catalyst is formed by compositing a preselected quantity of a porous, refractory inorganic oxide with a complex salt characterized by the formula

where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3, and heat decomposing the salt of said catalyst precursor composite in the presence of hydrogen and hydrogen sulfide to form said supported carbon-containing molybdenum sulfide or tungsten sulfide hydrotreating catalyst. Suitably, a solution of the salt, or admixture of salts, is incorporated with a preselected quantity of a porous, refractory inorganic oxide support, preferably a particulate mass of said support, the salt-containing support then preferably dried to remove all or a portion of the solvent from the support, and the dried particulate salt-containing support then heated in the presence of hydrogen and hydrogen sulfide to the decomposition temperature of said salt, or salts, to form the catalyst species of this invention. Suitably, sufficient of the salt, or salts, is incorporated on the support so that prior to, or at the time the salt, or salts, is decomposed from about 5 percent to about 30 percent, preferably from about 10 percent to about 25 percent of the salt, expressed as weight $MoO_3$ or $WO_3$ on an ignition loss free basis, will be present on the support. The supported catalyst species is stable, highly active and selective as a hydrotreating catalyst. The hydrotreating capacity of such catalysts in a preferred embodiment can be further promoted, and transformed into a yet more effective hydrotreating catalyst by the further incorporation therewith of a Group VIII metal or admixture of such metals, of the Periodic Table of the Elements (E. H. Sargent & Co., Copyright 1962, Dyne-Slide Co.).

The precise nature, and composition of the catalyst species that is formed as a reaction product of the decomposition reaction is not known, but it is believed that a catalyst species having the general formula $MS_{2-z}C_{z'}$, wherein M is molybdenum or tungsten, and z and z' are the same or different and range from about 0.01 to about 0.5, is formed, and supported upon the porous, refractory inorganic oxide base. The surface composition, or composition deposited on the surface of the support, is thus believed to correspond generally with the unsupported catalyst species defined in Application Ser. Nos. 399,999 and 399,991, each jointly filed by Theresa R. Pecoraro and Russel R. Chianelli, and Russel R. Chianelli and Theresa R. Pecoraro, respectively, filed Nov. 14, 1983, both abandoned; the disclosures of which are herewith incorporated by reference.

The catalyst species of Pecoraro and Chianelli are, like those of Applicants, defined as carbon-containing molybdenum and tungsten sulfides, useful for hydrorefining hydrocarbon feedstocks, and these basic materials can be promoted with transition metal sulfides such as cobalt sulfide. These catalyst species are preformed, or formed in-situ, by contacting a hydrocarbon feed at elevated temperature with one or more catalyst precursors selected from the group consisting of (a) ammonium thiomolybdate or thiotungstate salts, (b) ammonium molybdate or tungstate salts, (c) substituted ammonium thiomolybdate or thiotungstate salts, (d) substituted ammonium molybdate or tungstate salts, and mixtures thereof. Unlike Applicants' catalyst species, however, the catalyst species of Pecoraro and Chianelli are unsupported, bulk catalysts. They thus differ from the supported carbon-containing molybdenum and tungsten catalyst species defined herein; and differ substantially, inter alia, in that the catalyst species of the present invention achieves superior utilization of the catalytic metals present on the catalyst, and better hydrogen utilization.

A starting material for use in the preparation of the catalyst of this invention can, as suggested, be characterized as an organo or hydrocarbyl diammonium ion substituted, an ammonium or quaternary ammonium ion substituted, or an ionic form of a basic cyclic amine substituted thiomolybdate, or thiotungstate, salt having the formula $B_x[MO_yS_{4-y}]$, supra. In such formula B is thus an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is a substituted ammonium or quaternary ammonium ion, or an ionic form of a cyclic amine containing one or more basic N atoms, M is molybdenum or tungsten, preferably molybdenum, and y is 0, or a fraction or whole number ranging up to 3. Preferably y ranges from 0 to 0.5. In the formula the B moiety, or moieties, constitutes a cationic entity, or entities, which forms a complex with an anionic $[MO_yS_{4-y}]^{2-}$ moiety. An organo, or hydrocarbyl diammonium ion moiety thus provides two positive charges in formation of a $B_x[MO_yS_{4-y}]$ salt. On the other hand, two of the substituted ammonium or quaternary ammonium ions, or anionic form of a cyclic amine which contains one or more basic N atoms complex with an anionic $[MO_yS_{4-y}]^{2-}$ moiety. The substituent amino groups of the organo, substituted diammonium ion, or substituted ammonium ion, where B is a substituted diammonium ion or substituted ammonium ion, can be characterized as primary, secondary or tertiary, in that the hydrogen atoms of one or both of the substituent amino groups of B can be substituted or unsubstituted as with an organo, a hydrocarbyl radical or hydrocarbon radical selected from the group consisting of alkyl, aralkyl, cycloalkyl, aryl, alkaryl, alkenyl, and alkynyl, preferably alkyl or aryl, and including such radicals when inertly substituted. Such radical can thus be exemplified by hydrocarbon groups which contain from about one to about 30 carbon atoms, preferably from about one to about 20 carbon atoms. When the hydrocarbyl, or hydrocarbon radical is alkyl, it can typically be methyl, ethyl, n-propyl, iso-propyl, n-butyl, i-butyl, sec-butyl, amyl, octyl, decyl, octadecyl, and the like. When it is aralkyl it can typically be benzyl, beta-phenylethyl, and the like. When it is cycloalkyl, it can typically be cyclopentyl, cyclohexyl, cycloheptyl, cyclooctyl, 2-methyl-cycloheptyl, 3-butyl cyclohexyl, 3-methyl cyclohexyl, and the like. When it is aryl, it can typically be phenyl, ethylphenyl, and the like. When alkaryl, it can typically be tolyl, xylyl, and the like. When alkenyl, it can typically be vinyl, allyl, 1-butenyl, and the like. When it is alkynyl, it can typically be ethynyl, propynyl, butynyl, and the like. The hydrocarbyl, or hydrocarbon radical can be inertly substituted, i.e., it may bear a non-reactive substituent such as alkyl, aryl, cycloalkyl, ether, halogen, nitro, and the like. Typically inertly substituted groups may include 3-chloropropyl, 2-ethoxyethyl, 4-methyl cyclohexyl, p-chlorophenyl, p-chloro benzyl, 3-chloro-5-methylphenyl, and the like.

Exemplary of B, i.e., where B is a diammonium ion substitutient of such salts, are the ionic forms of aliphatic diamines; e.g., alkyl diamines such as those derived from straight chain hydrocarbons which contain an amino group on two different carbon atoms, as on each terminal carbon atom, i.e., $H_2N(CH_2)_nNH_2$, where n ranges from 1 to about 30, preferably from 1 to about 20, illustrative of which are methyl diamines, ethylene diamines, n-propyl diamines, hexyl diamines, decyl diamines, dodecyl diamine, and the like, and including aliphatic diamines which contain amino groups on adjacent carbon atoms such as 1,2 bis(amino)-n-butane, or those which contain amino groups on separated carbon atoms such as 1,3 bis(amino)-n-butane, or the like; cyclic diamines, e.g., aromatic diamines, such as those which contain two primary amino groups attached to a fused or non-fused ring structure, e.g., p-diamino benzene, phloroglucinol, o-diamino naphthalene, p-phenylenediamines, and the like. Suitable salts formed from such substitutients are thus exemplified by $[H_3NC_3H_6NH_3][MoO_{0.5}S_{3.5}]$;
$[H_3NC_6H_{12}NH_3][MoO_{0.3}S_{3.7}]$;
$[H_3NC_8H_{16}NH_3][WO_{0.5}S_{3.5}]$;
$[CH_3CHNH_3CHNH_3C_2H_5][MoO_{0.4}S_{3.6}]$;
$[CH_3CHNH_3CH_2CHNH_3C_3H_7][MoO_{0.5}S_{3.5}]$;
$[CH_2CHNH_3CH_2CHNH_3C_3H_7][MoS_4]$;
and the like.

The B moieties of the substituted ammonium thiomolybdate, or thiotungstate salt can, as suggested, also be constituted of ammonium ions wherein one or more of the hydrogen atoms of the ions have been replaced by an organo, hydrocarbyl or hydrocarbon radical, selected from the group consisting of alkyl, aralkyl, cycloalkyl, aryl, alkaryl, alkenyl and alkynyl, including such radicals when inertly substituted. The hydrocarbon moiety is exemplified by hydrocarbon groups which contain from 1 to about 30 carbon atoms, preferably from about one to about 20 carbon atoms. Exemplary of substitutients associated with, or substituted upon the ammonium or quaternary ammonium ion to form each of the two B constituents of the salt are, when the substituent is alkyl, methyl, ethyl, n-propyl, iso-propyl, n-butyl, i-butyl, sec-butyl, amyl, octyl, decyl, octadecyl, and the like; when the substituent is aralkyl, benzyl, betaphenylethyl, and the like; when the substituent is cycloalkyl, cyclopentyl, cyclohexyl, cycloheptyl, cyclooctyl, 2-methylcycloheptyl, 3-butyl cyclohexyl, 3-methyl cyclohexyl, and the like; when the substituent is aryl, phenyl, ethylphenyl, and the like; when the substituent is alkaryl, tolyl, xylyl, and the like; when the substituent is alkenyl, vinyl, allyl, 1-butenyl, and the like; when the substituent is alkynyl, ethynyl, propynyl, butynyl, and the like. The substituent, as suggested, can be inertly substituted, i.e., it may bear a non-reactive substitutent such as alkyl, aryl, cycloalkyl, ether, halogen, nitro, and the like. Typically inertly substituted groups may include 3-chloropropyl, 2- ethoxyethyl, 4-methyl cyclohexyl, p-chlorophenyl, p-chloro benzyl, 3-chloro-5-methylphenyl, etc. Substituted ammonium ions of such types are thus those containing one organo or hydrocarbyl group, e.g., n-$C_4H_9NH_3^+$, $C_6H_5NH_3^+$, and the like, those containing two organo or hydrocarbyl groups, e.g., $(C_2H_5)_2NH_2^+$, $(C_6H_5)_2NH_2^+$, and the like, those containing three organo or hydrocarbyl groups, e.g., n-$(C_6H_{13})_3NH^+$, $(C_6H_5)_3NH^+$, and the like; and those containing four organo or hydrocarbyl groups, e.g., $(C_6H_5CH_2)_4N^+$, $(C_6H_5)_4N^+$, and the like. Suitable salts useful in the practice of this invention are thus exemplified by
$H_3NC_6H_4NH_3[MoO_{0.2}S_{3.8}]$;
$[(C_2H_5)NH_3^+]_2[MoO_{0.4}S_{3.6}]$;
$[(C_6H_5)_2NH_2^+]_2[MoO_{0.4}S_{3.6}]$;
$[(C_6H_5)_2NH_2^+]_2[MoO_{0.1}S_{3.9}]$;
$[(C_6H_{13})_3NH^+]_2[MoO_{0.2}S_{3.8}]$;
$[(C_6H_5)_4N^+]_2[MoO_{0.1}S_{3.9}]$;
$[(C_6H_{13})_4N^+]_2[MoS_4]$; $[(C_6H_5)_4N^+]_2[WS_4]$;
and the like.

The B moieties of the catalyst precursor salt can, as suggested, also be constituted of an ionic form of a cyclic amine which contains one or more basic nitrogen atoms within the ring, generally from one to about three basic atoms in the total molecule. This class of compounds can be constituted of rings having 5, 6, or more members, and can be monocyclic or polycyclic, fused or non-fused rings, non-substituted or inertly substituted, which contain from one to about 3 basic nitrogen atoms in the total molecule. Exemplary of ionic forms of cyclic amines of this character are the ionic forms of such monocyclic five membered rings as pyrrole, isopyrrole, pyrazole, 2-isoimidazole, 1,2,3-triazole and the like; such monocyclic six membered rings as pyridine, pyridazine, pyrimidine, pyrazine, s-triazine and the like; and such fused ring, polyclic structures as indole, 1,5-pyrindine, quinoline, naphthyridine, purine, acridine and the like. Suitable salts useful in the practice of this invention are thus exemplified by
$[C_5H_5NH]_2[MoO_{0.5}S_{3.5}]$; $[C_4H_4N_2H]_2[MoO_{0.5}S_{3.5}]$;
$[C_4H_4N_2H]_2[WO_{0.4}S_{3.6}]$; $[C_3H_3N_3H]_2[MoO_{0.2}S_{3.8}]$;
$[C_8H_8N_2H]_2[MoO_{0.4}S_{3.6}]$; $[C_{13}H_{13}NH]_2[MoS_4]$
and the like.

The organo or hydrocarbyl diammonium ion substituted, ammonium or quaternary ammonium ion substituted, or ionic form of a basic cyclic amine substituted thiomolybdate, or thiotungstate, salt is preferably impregnated upon a porous, refractory, inorganic oxide support, suitably by first dispersing or dissolving said salt, or admixture of salts, in a suitable solvent, and then admixing or slurrying a preselected amount of the precursor thiomolybdate, or thiotungstate, salt solution with a preselected quantity of said support material in particulate form. Virtually, any solvent can be employed which is capable of dissolving the precursor thiomolybdate or thiotungstate salt, without adversely reacting therewith. Albeit, an aqueous solvent can be employed, non aqueous solvents are preferred because few of the organo or hydrocarbyl diammonium ion substituted, ammonium or quaternary ammonium ion substituted, or ionic form of basic cyclic amine substituted thiomolybdate, or thiotungstate, salts are adequately soluble in water. Suitable solvents for dissolving these salts are alcohols, ethers, ketones, paraffins, cycloparaffins and aromatic hydrocarbons, exemplary of which are methyl alcohol, ethyl alcohol, n-propyl alcohol, isopropyl alcohol, n-butyl alcohol, isobutyl alcohol, sec-butyl alcohol, t-butyl alcohol, ethyl ether, tetrahydrofuran, acetone, methyl ethyl ketone, hexane, heptane, cyclobutane, aromatic hydrocarbons, notably those having a single benzene nucleus, especially aromatic hydrocarbons containing from about 6 to about 9 carbon atoms, e.g., benzene, toluene, xylene, n-propyl benzene, isopropyl benzene, and the like; and cycloparaffin hydrocarbons which contain from about 4 to about 9 carbon atoms, e.g., cyclobutane, cyclopentane, cyclohexane, cycloheptane, and the like. Preferred solvents are alcohols, especially the low molecular weight simple alcohols, e.g., methyl alcohol, ethyl alcohol and the like; amines, e.g., butyl amine, ethylenediamine and the like; and ketones, e.g., acetone, methylethyl ketone, and the like.

The organo or hydrocarbyl diammonium ion substituted, ammonium or quanternary ammonium ion substituted, or ionic form of a basic cyclic amine substituted thiomolybdate, or thiotungstate, salt is composited or otherwise intimately associated with the porous, inorganic oxide support by various techniques known to the art, such as coprecipitation, impregnation or the like. The composite is preferably formed from a solution of the desired salt, or salts by impregnation of the support, typically via an "incipient wetness" technique which requires a minimum of solution so that the total solution with the preselected desired amount of the catalyst precursor salt is adsorbed, initially or after some evaporation. Typically, a particulate porous refractory inorganic oxide, notably alumina, in the form of beads, pills, pellets, seived particles, extrudates, or the like in dry or solvated state is contacted with a solution of the salt, or admixture of the salts, with the result that the salt solution is adsorbed into the particulate material in the desired amount. The salt-containing particulate material can thereafter be heated and dried at low temperature, with or without vacuum assistance, e.g., at temperatures ranging at or below the boiling temperature of the solvent.

The preferred support is alumina, and the composite support can contain for example, one or more of alumina, bentonite, clay, diatomaceous earth, zeolite, silica, activated carbon, magnesia, zirconia, thoria, titania and the like, these latter with alumina, usually in a range of about 1 to 20 percent, based on the weight of the support. A preferred support for the practice of the present invention is one having a surface area of more than 50 m²/g, preferably from about 100 to about 300 m²/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The catalyst precursor material, or material formed by impregnation of the support with the organo or hydrocarbyl diammonium ion substituted, substituted ammonium or quaternary ammonium ion, or ionic form of a basic cyclic amine salt is preferably dried to remove all or a portion of the solvent, but it is never calcined after the salt is added to the support. The support is preferably dried at a temperature below about 100° C., more preferably between about 50° C. and 80° C., in the presence of nitrogen or oxygen, or both, at static or dynamic conditions, in air or under vacuum. The catalyst precursor material, on a dry basis, contains from about 5 percent to about 30 percent, preferably from about 10 percent to about 25 percent of the undecomposed organo or hydrocarbyl diammonium ion substituted, ammonium or quaternary ammonium ion substituted, or ionic form of a basic cyclic amine substituted thiomolybdate, or thiotungstate, salt, expressed as weight MoO₃ or WO₃ on an ignition loss free basis.

The catalyst precursor is heated to the decomposition temperature of the impregnating salt, and the salt decomposed in the presence of hydrogen, and hydrogen sulfide, to form the supported catalyst species of this invention. The hydrogen required for forming the catalysts of this invention may be pure hydrogen, an admixture of gases rich in hydrogen or a compound which will generate in situ hydrogen, e.g., a hydrogen-bearing gas such as hydrogen sulfide, or a hydrogen donor solvent. The hydrogen sulfide can likewise be added as an essentially pure gas, as a gas which contains hydrogen sulfide; or the hydrogen sulfide can be generated in situ from a sulfur-containing compound, e.g., a sulfur dioxide, carbon disulfide or thiocarbamide. Suitably, the catalyst precursor composition is heated, and the salt portion thereof decomposed in a hydrogen atmosphere which contains from about 0.5 percent to about 50 percent, preferably from about 5 percent to about 20 percent hydrogen sulfide, based on the total volume of gas.

In decomposing the catalyst precursor, a bed of the dried catalyst precursor is contacted in a hydrogen sulfide/hydrogen atmosphere and heated at conditions which decompose the diammonium ion substituted, ammonium or quaternary ammonium ion substituted, or ionic form of a basic cyclic amine substituted thiomolybdate, or thiotungstate, salt component of said catalyst precursor. For example, a fixed bed of the dried catalyst precursor is charged into a reaction vessel and contacted with the gaseous hydrogen sulfide/hydrogen admixture at temperature sufficient to thermally decompose the salt portion of the catalyst precursor composite, such temperature generally ranging from about 150° C. to about 400° C., or more often from about 200° C. to about 370° C., a flow rate of hydrogen sulfide/hydrogen ranging from about 50 to about 5000 V/H/V, preferably from about 100 to about 1000 V/H/V, and at pressures ranging from about 0 to about 2000 pounds per square inch gauge (psig), preferably 0 to about 200 psig. Thereafter the feed hydrocarbon, or admixture of liquid hydrocarbons, can be introduced to initiate the hydrotreating operation, the feed being introduced generally at a flow rate of hydrocarbon:catalyst at from about 0.05 to about 50, preferably from about 0.1 to about 10, volumes of hydrocarbon per volume of catalyst per hour, a flow rate of hydrogen ranging from about 250 to about 5000 SCF/B, preferably from about 500 SCF to about 3000 SCF/B, and at pressures ranging from about 50 to about 4000 psig, preferably from about 150 to about 2500 psig. Typically the hydrocarbon is introduced downflow, but can be introduced upflow or downflow over the bed of catalyst. The temperature of the reaction if necessary after formation of the catalyst is gradually raised after the decomposition temperature of the organo or hydrocarbyl diammonium ion substituted, ammonium or quaternary ammonium ion substituted, or ionic form of a basic cyclic amine substituted thiomolybdate, or thiotungstate, salt component is reached.

In the preparation of the catalysts of this invention, the salts of the catalyst precursor composite are decomposed in an atmosphere of hydrogen sulfide and hydrogen at temperatures ranging between about 150° C. and 400° C., and more generally between about 200° C. and 370° C. which temperatures correspond generally with, or are exceeded by hydrotreating temperatures. Where, however, the decomposition temperature of the catalyst precursor is lower than the desired hydrotreating temperature, the temperature in conducting the hydrotreating process is raised to that which is desired for conducting the hydrotreating operation. In a typical operation, sulfiding conditions are provided, and the temperature is gradually raised to the decomposition temperature of the catalyst precursor, the catalyst precursor is decomposed in the presence of the hydrogen sulfide and hydrogen to form the catalytically active species, and the temperature then further increased as desired to conduct the hydrotreating operation. Hydrotreating conditions vary considerably depending on the nature of the hydrocarbon being hydrogenated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to about 350° C., a heavy gas oil boiling within a range of from about 325° C. to about 475° C., or residuum containing from about 10 percent to about 50 percent of a material boiling above about 575° C.

| Feed | | Temp., °C. | Pressure psig | Space Velocity V/V/Hr | Hydrogen Gas Rate SCF/B |
|---|---|---|---|---|---|
| Naptha | Typical | 100–370 | 150–800 | 0.5–10 | 100–2000 |
| | Preferred | 150–260 | 250–400 | 2–6 | 500–1500 |
| Diesel Fuel | Typical | 200–400 | 250–1500 | 0.5–4 | 500–6000 |
| | Preferred | 260–340 | 00–1000 | 1–2 | 1000–2000 |
| Heavy Gas Oil | Typical | 160–430 | 250–2500 | 0.3–2 | 1000–6000 |
| | Preferred | 320–385 | 600–1250 | 0.5–1 | 1500–4000 |
| Residuum | Typical | 340–450 | 1000–5000 | 0.1–1 | 2000–10,000 |
| | Preferred | 360–400 | 1250–2000 | 0.25–0.5 | 4000–6000 |

The catalyst of this invention can be promoted to further dramatically increase the activity of the finished catalyst by the further addition of a Group VIII metal of the Periodic Table of the Elements (E. H. Sargent & Co., Copyright 1962, Dyna-Slide Co.), which metal can be added to the refractory porous inorganic oxide, or alumina, support prior to, simultaneously with, or subsequent to the decomposition of the organo or hydrocarbyl diammonium ion substituted, ammonium or quaternary ammonium ion substituted, or ionic form of a basic cyclic amine substituted thiomolybdate, or thiotungstate, salt on treatment of the catalyst precursor in the presence of hydrogen sulfide and hydrogen. Suitably such metal promoter, or metal promoters, particularly iron, cobalt and nickel, alone or in admixture one metal with another, is incorporated with the support, notably alumina, as via cogellation or impregnation prior to incorporation of the organo or hydrocarbyl diammonium ion substituted, ammonium or quaternary ammonium ion substituted, or ionic form of a basic cyclic amine substituted thiomolybdate, or thiotungstate, salt with the dried, calcined support. Preferably, the metal promoter, or metal promoters, is added to the catalyst after the organo or hydrocarbyl diammonium ion substituted, ammonium or quaternary ammonium ion substituted, or ionic form of a basic cyclic amine substituted thiomolybdate, or thiotungstate, salt impregnated upon the support has been treated, and decomposed.

The Group VIII metal components, admixed one component with another or with a third or greater number of metal components, can be composited or intimately associated with the porous inorganic oxide support by impregnation of the support with metals, e.g., with the alumina, by an "incipient wetness" technique, or technique wherein a metal, or metals is contained in a solution, preferably water or alcohol, in measured amount and the entire solution is absorbed into the support and subsequently dried, and calcined if desired, to form the catalyst. The volume amount of solution to be employed in such recipe is separately determined by measuring the amount of solvent required to wet a known weight of support to the point where some liquid bridging between particles or some miniscus formation between particles and container walls just becomes evident. This ratio of volume of solution to weight of support is then used proportionally to calculate the volume of solution containing catalytic metals to be used in the incipient wetness impregnation. Impregnation by adsorption of the metals from dilute solution onto the support can also be used but this method is more appropriate for low concentrations, e.g., from about 0.01 to about 1.0 percent of catalytic metals desired, and it is less preferable for use in the higher metals concentration ranges. The metal impregnated support, after impregnation, is dried, e.g., at temperatures ranging from about 20° C. to about 150° C., preferably at ambient temperatures, e.g., from about 20° to about 30° C., until free flowing and then from about 80° C. to about 110° C. as in a circulating air, vacuum oven, microwave oven, or the like.

The following examples, with comparative demonstrations, are further exemplary of the highly active, highly selective catalysts of this invention for use in hydrotreating, especially hydrodesulfurization (HDS) or hydrodenitrogenation (HDN), or both. In the examples and demonstrations which follow, all parts are in terms of weight units, pressures in terms of pounds per square inch gauge, temperatures are expressed in terms of degrees Centigrade, gas flow rates in terms of SCF/Bbl, and liquid flow rates in terms of LHSV except as otherwise specified.

EXAMPLE 1

This example demonstrates the advantages of catalysts prepared by the process of this invention, i.e., by decomposing the supported complex salt, $B_x[MO_yS_{4-y}]$, in the presence of hydrogen sulfide and hydrogen to produce a catalyst of high hydrodenitrogenation activity, and acceptable hydrodesulfurization activity. The hydrodenitrogenation and hydrodesulfurization activity of this catalyst is compared with one produced according to the method disclosed and claimed in our copending Application Ser. No. 400,004 filed July 20, 1982 now U.S. Pat. No. 4,431,747 which issued Feb. 14, 1984, and with a commercially available hydrodesulfurization catalyst.

A solution was prepared by dissolving 38.628 g of tetrabutylammonium thiomolybdate in enough methanol to give 80 ml of solution. Analysis of the tetrabutylammonium thiomolybdate indicated that it had the approximate formula $((C_4H_9)_4N)_2(MoO_{0.2}S_{3.8}) \cdot 1.7 \text{-} H_2O$. A 50 ml portion of this solution was used to impregnate to incipient wetness 50 g of gamma alumina, which had 265.7 m$^2$/g surface area and 0.750 ml/g pore volume, and which had been ground and screened to 14/35 Tyler mesh and calcined 4 hours at 540° C. before impregnation. The alumina was dried overnight in a vacuum desiccator, then impregnated with the remaining 30 ml of solution and dried for 5 hours in a vacuum desiccator. The 88.3 g of impregnated alumina so prepared contained 13.29 weight percent MoO$_3$ on an ignition-loss free basis (ignition loss=38.6%).

Two catalysts, designated A and B, were prepared from this same batch of impregnated alumina. Catalyst A was prepared by decomposing the catalyst precursor composite in an atmosphere of hydrogen, hydrocarbon and sulfur as disclosed and claimed in U.S. Pat. No. 4,431,747, whereas Catalyst B, the catalyst of this invention, was prepared by decomposing the catalyst precursor composite in the presence of hydrogen and hydrogen sulfide.

In the preparation of catalyst A, 28.0 g (35 ml) of the impregnated alumina was thermally decomposed in a fixed bed reactor by (1) heating under 500 psig of H$_2$ to 200° C., (2) establishing a liquid feed flow of 0.825 LHSV with a blend of 5% dibenzothiophene (DBT) dissolved in decalin and a gas flow of 900 SCF/B with 100% H$_2$, still at 500 psig, (3) holding 4.5 hours at 200° C., and then (4) heating to 330° C. and holding for 16 hours. The reactor was cooled under hydrogen and discharged in an inert atmosphere, yielding 19.77 g of solids material. The solids material was promoted by impregnating in an inert atmosphere with 2.54 g of cobalt nitrate, dissolved in enough acetone to give 16 ml of solution, and drying overnight in a vacuum desiccator. The finished Catalyst A contained 3.73 weight percent CoO and 14.01 weight percent MoO$_3$, on an ignition-loss free basis (ignition loss=19.5%), and had 183 m$^2$/g surface area and 0.425 ml/g pore volume.

In the preparation of Catalyst B, the catalyst of this invention, 24.2 g (30 ml) of the impregnated alumina was thermally decomposed in a fixed bed reactor by (1) establishing a flow of 15.0 std liters/hr of nitrogen at room temperature and atmospheric pressure, (2) heating to 200° C., (3) switching to a flow of 15.0 std liters/hr of 10 vol.% hydrogen sulfide in hydrogen, at atmospheric pressure, (4) holding at 200° C. for 2 hours, and the (5) heating to 327° C. and holding for 16 hours. The reactor was cooled under nitrogen and discharged in an inert atmosphere yielding 17.6 g of solids material. The solids material was promoted by impregnating in an inert atmosphere with 2.18 g of cobalt nitrate, dissolved in enough acetone to give 14 ml of solution, and drying overnight in a vacuum desiccator. The finished Catalyst B contained 4.24 weight percent CoO and 13.63 weight percent MoO$_3$, on an ignition-loss free basis (ignition loss=15.8%). The catalyst also contained 2.31 wt. % carbon and 5.70 wt. % sulfur, and had 188 m$^2$/g surface area and 0.492 ml/g pore volume.

The catalytic activity of Catalyst A and B were measured in a side-by-side hydrotreating test, along with a conventional, commercially available cobalt molybdenum catalyst, designated "X". The conventional catalyst contained 3.22 weight percent CoO and 12.81 weight percent MoO$_3$, and had 239 m$^2$/g surface area and 0.471 ml/g pore volume. The test feedstock was a Baton Rouge light catalytic cycle oil (LCCO) designated FS-4754. Inspections on this feedstock are given in Table I.

TABLE I

| Feedstock Inspections | | | |
|---|---|---|---|
| | Feedstock No. | | |
| | FS-4574 | FS-4754 | FS-5171 |
| API Gravity | 25.1 | 19.3 | 15.6 |
| Sulfur, Wt. % | 1.41 | 1.48 | 1.74 |
| Nitrogen, ppm | 228 | 327 | 274 |
| Bromine No. mg/cc | 6.3 | 4.4 | 5.6 |
| Carbon, wt. % | 87.36 | 88.51 | 88.81 |
| Hydrogen, wt. % | 11.23 | 9.98 | 9.42 |
| FIA Aromatics | 49.0 | 71.0 | |
| Olefins | 8.5 | 2.5 | |
| Saturates | 42.5 | 27.0 | |
| Distillation | | | |
| 5% | 448 | 473 | 465 |
| 50% | 541 | 538 | 516 |
| 95% | 671 | 634 | 642 |

Hydrotreating conditions were 330° C., 750 psig, and 1200 SCF/B of 100% $H_2$ with space velocities ranging from 0.5 to 2.0 V/H/V. Activity was measured as the reciprocal space velocity required to reach a given desulfurization or denitrogenation target, and relative activities remained constant over the entire range of 85–97% HDS and 62–98% HDN. Per gram of molybdenum, Catalyst A had 1.47 times the desulfurization activity and 1.81 times the denitrogenation activity of the conventional catalyst. Catalyst B had only 0.79 times the desulfurization activity of the conventional catalyst, but had 1.70 times the denitrogenation activity. Catalyst B, has a much higher HDN/HDS selectivity than either the commercial catalyst or Catalyst A, albeit. Catalyst A has much higher HDS activity than either catalyst B or the conventional catalyst.

These data clearly demonstrate the advantage of carrying out the decomposition of the catalyst precursor composite in the presence of hydrogen sulfide and hydrogen when high HDN/HDS selectivity is desired. It also demonstrates the difference between the catalysts of this invention and otherwise similar but unsupported catalysts of Pecoraro and Chianelli, or Chianelli and Pecoraro, supra, because of the selectivity in the preparation of the catalysts.

EXAMPLE 2

A solution was prepared by dissolving 14.50 g of an ethylenediamine salt of thiomolybdic acid in 43.5 ml of butylamine. Analysis of the salt indicated that only one nitrogen of each ethylenediamine moiety was protonated, and that the salt had the approximate formula $(H_2NC_2H_4NH_3)_2(MoO_{0.5}S_{3.5})$. This solution was used to impregnate 46.9 g of the same 14/35 mesh gamma alumina used in Example 1. The alumina was dried overnight in a vacuum desiccator. The impregnated alumina was then treated to decompose the thiomolybdate salt by heating at a rate of 4°/min to a final temperature of 327° C., in a fixed bed reactor with a flow of 10% $H_2S$/90% hydrogen, at a flow rate of 500 volumes of gas per volume of catalyst per hour. The reactor was cooled under nitrogen and the product discharged in an inert atmosphere. Of the 52.0 g of material so prepared, 50.0 g of the solids material was then impregnated with a solution of 7.04 g of cobalt nitrate, dissolved in enough acetone to give incipient wetness, and dried overnight in a vacuum desiccator. This catalyst, designated C, contained 3.49 weight percent CoO and 11.04 weight percent $MoO_3$, on a ignition-loss free bais (ignition loss=11.21%). It also contained 3.00 wt. % carbon and 4.71 wt. % sulfur.

The catalytic activity of Catalyst C was measured in a side-by-side comparison with the same conventional catalyst, Catalyst X, described in Example 1, treating the feedstock FS-4574 (Table I) at 330° C., 520 psig, and 600 SCF/B. Catalyst C, like Catalyst B, showed a very high HDN/HDS selectivity, with 0.69 times the desulfurization activity of the conventional catalyst, and 1.27 times the denitrogenation activity.

EXAMPLE 3

A tridodecylamine salt of thiomolybdic acid was made in the following manner. A portion, 1.88 g, of commercial "Molybdic Acid" (Mostly an ammonium molybdate, containing 85% $MoO_3$) was suspended in 150 ml of water, which was saturated with hydrogen sulfide by sparging with 100% $H_2S$ for ten minutes. The solution was extracted vigorously in a separatory funnel with a second solution of 10.4 g of tridodecylamine in 150 ml of toluene. The solution was then re-saturated and re-extracted with toluene in the same manner three additional times. The toluene extract was dried overnight in a vacuum oven at 60° C., washed 3 times with hexane, and dried for 4 more hours, yielding about 5.5 g of tridodecylamine thiomolybdate, a brown tarry material. Chemical analyses indicated that the brown tarry material had the approximate formula $((C_{12}H_{25})_3NH)(NH_4)(MoO_{1.5}S_{2.5}))$.

A solution of 11.1 g of this material in 150 ml of toluene was slurried with a 16.7 g portion of the same calcined 14/35 mesh gamma alumina described in Example 1. The mixture was stirred under a nitrogen blanket while the toluene slowly evaporated. The large, bulky tridodecylamine thiomolybdate molecules were absorbed by the alumina, diffusing into the alumina slowly, the sample having had to be re-wetted with toluene and re-dried several times, until a piece of alumina, broken open, revealed a uniform brown color across its interior. This procedure yielded 22.6 g of material which contained 7.01 wt. % $MoO_3$, on an ignition-loss free basis (ignition loss=19.5%).

This material was thermally decomposed in 10% $H_2S$/90% $H_2$, discharged in an inert atmosphere, and promoted with cobalt nitrate in acetone solution in the same manner described in Example 2, except that the maximum decomposition temperature was 370° C. The finished catalyst, designated D, contained 2.78 wt. % CoO and 8.25 wt. % $MoO_3$, on an ignition-loss free basis (ignition loss=15.2%). The finished Catalyst D also contained 8.07 wt. % carbon and 2.56 wt. % sulfur, and had 162 m$^2$/g surface area and 0.426 ml/g pore volume.

The catalytic activity of Catalyst D was measured in the same manner as Catalyst C, at the same conditions. Per gram of molybdenum, Catalyst D had 1.13 times the desulfurization activity of the conventional Catalyst X and 1.27 times its denitrogenation activity. This catalyst has a significantly higher HDN activity than the conventional Co/Mo catalyst, and showed some improvement in HDN/HDS selectivity.

EXAMPLE 4

A solution was prepared by dissolving 12.32 g of hexanediamine thiomolybdate in 30 ml of butylamine. Analysis of the salt showed that, unlike the ethylenediamine salt, both nitrogens in each hexanediamine moiety were protonated. The salt had the approximate formula $(H_3NC_6H_{12}NH_3)(MoO_{0.1}S_{3.9})$. This solution was used to impregnate 33.4 g of the same calcined 14/35 mesh gamma alumina used in Example 1. The alumina was dried overnight at 60° C. in a stream of flowing nitrogen at reduced pressure, about 3-5 psia. The alumina was then treated to decompose the thiomolybdate in the same manner described in Example 2.

Of the approximately 37 g of solids material so prepared, 17.0 g was impregnated with a solution of 2.47 g of cobalt nitrate dissolved in 32.3 ml of acetone, and dried overnight in a vacuum desiccator. This catalyst, designated E, contained 3.65 wt. % CoO and 12.9 wt. % $MoO_3$, on an ignition-loss free basis (ignition loss=18.6%). The catalyst also contained 2.97 wt. % carbon and 4.61 sulfur, and had 186 $m^2g$ surface area and 0.507 ml/g pore volume.

The catalyst activity of Catalyst E was measured by hydrotreating feed FS-4574 (Table I) at 330° C., 750 psig, and 1200 SCF/B hydrogen. Catalyst E was compared to a particularly promising conventional catalyst designated Y, which contained 4.50 wt. % CoO, 19.5 wt. % $MoO_3$, and 3.25 wt. % phosphorus. Catalyst Y is unusually active for denitrogenation, this being believed due to the presence of the phosphorus. However, based on effectiveness per gram of molybdenum, Catalyst E had 0.92 times the desulfurization activity of Catalyst Y and 1.14 times its denitrogenation activity. Even in this difficult comparison, Catalyst E showed an unusually high HDN/HDS selectivity.

EXAMPLE 5

In this example, the promoter was put onto the alumina before the amine thiomolybdate compound.

A solution of 5.34 g of cobalt nitrate dissolved in 35.9 ml of water was used to impregnate 33.4 g of the same calcined 14/35 mesh gamma alumina described in Example 1. The sample was allowed to stand covered at room temperature overnight, was dried for 6 hours at 120° C., and then was calcined overnight at 540° C. The specimen was impregnated a second time with a solution of 12.4 g of hexanediamine thiomolybdate dissolved in 35 ml of butylamine. Analysis of this batch of hexanediamine thiomolybdate indicated that the specimen was fully sulfided and had the approximate formula $(H_3NC_6H_{12}NH_3)(MoS_4)$.

The sample was dried overnight in a vacuum desiccator. The specimen was then treated to decompose the thiomolybdate by heating at a rate of 4°/min to a final temperature of 327° C., in a fixed bed reactor with a flow of 10% $H_2S$/90% hydrogen, at a flow rate of 500 volumes of gas per volume of catalyst per hour. The reactor was cooled under nitrogen and the product discharged in an inert atmosphere to give Catalyst F.

The nominal metals contents of Catalyst F, i.e., metals content based on recipe rather than direct analysis, are 3.4 wt. % CoO and 13.0 wt. % $MoO_3$, on an ignition-loss free basis. The ignition loss was measured, and was 16.6 wt. %. The catalyst also contained 4.01 wt. % carbon and 6.83 wt. % sulfur.

The catalytic activity of Catalyst F was measured in a run identical to that conducted with Catalyst E, and compared against the same phosphorous-containing conventional Catalyst Y. Putting on the promoter before the thiomolybdate via-a-vis putting the thiomolybdate on the support before the promotor it was shown had little effect, in changing catalytic activity. Per gram of molybodenum, Catalyst F had 0.98 times the desulfurization activity of Catalyst Y, and 1.15 times its denitrogenation activity.

EXAMPLE 6

Examples 4 and 5 were repeated, except that this instance the promoter was impregnated after the amine thiomolybdate was put onto the alumina, but before the thiomolybdate was thermally decomposed. This slight change in the method of preparing the catalyst, it will be observed, had a major effect on catalytic selectivity.

A solution was prepared by dissolving 50.0 g of hexanediamine thiomolybdate in 165 ml of butylamine. Analysis of this particular batch of hexanediamine thiomolybdate indicated that it, like the batch used in Example 5, was fully sulfided and had the approximate formula $(H_3NC_6H_{12}NH_3)(MoS_4)$. The solution was filtered, and 95 ml of the filtrate was used to impregnate 90.2 g of the calcined 14/35 mesh gamma alumina. This alumina was very similar to the alumina described in Example 1, and had 255 $m^2/g$ surface area and 0.684 ml/g pore volume. The alumina was dried overnight at 45° C. under flowing nitrogen at reduced pressure, about 3-5 psia, then impregnated with the remaining butylamine solution and again dried overnight at the same conditions.

The 146.9 g of solids material so prepared was impregnated with a second solution, made by dissolving 15.8 g of cobalt nitrate in enough acetone to give 45 ml of solution. The impregnated alumina was again dried overnight at the same conditions to give 161.2 g of catalyst, designated G. The finished Catalyst G contained 3.83 wt. % CoO and 17.4 wt. % $MoO_3$, on an ignition-loss free basis (ignition loss=30.09%). Catalyst G also contained 11.37 wt. % carbon and 11.18 wt. % sulfur, and had 40.6 $m^2/g$ surface area and 0.158 ml/g pore volume.

The catalyst precursor was thermally decomposed in the same fixed bed reactor in which the activity test was carried out. Prior to the activity test, a flow of 500 V/H/V of 10% $H_2S$ in hydrogen was established, at atmospheric pressure and room temperature. The temperature was increased to 200° C. at about 1.5°/min, held at 200° C. for 2 hours, then increased to 330° C. at about 1°/min and held at 330° C. for 16 hours. The reactor was then cooled to 325° C. and pressurized with hydrogen. Treat gas and liquid feed flows to the reactor were established. Thest conditions were 325° C., 750 psig, and 1500 SCF/B, to hydrotreat the FS-4754 feedstock. Because of the higher metals content of Catalyst G, the comparison was made against a third conventional catalyst, designated Z, which contained 4.08 wt. % CoO and 15.86 wt. % $MoO_3$. Catalyst Z had 235 $m^2/g$ surface area and 0.480 ml/g pore volume. Catalyst Z typically shows somewhat higher activity, but very similar selectivity patterns, as the first conventional catalyst, X.

In this test, Catalyst G had 0.83 times the denitrogenation activity of Catalyst Z. The overall activity is somewhat low, but the HDN/HDS selectivity is more than 9 times that of a conventional hydrotreating catalyst. The desulfurization activity is only 0.09 times that of a conventional hydrotreating catalyst.

EXAMPLE 7

Conventional sulfided molydenum hydrotreating catalysts are often promoted with nickel instead of cobalt, and this frequently increases the HDN/HDS selectivity. In this example, a direct comparison is made of the effects of nickel vs. cobalt promotion for the catalysts of this invention. It is shown that the catalysts of this invention have high selectivity for nitrogen removal, not only by comparison to sulfur removal, but also by comparison to hydrogen consumption.

A solution was prepared by dissolving 72.0 g of tetrabutylammonium thiomolybdate in enough methanol to give 180 ml of solution. Analysis of the tetrabutylammonium thiomolybdate indicated that it had the approximate formula $((C_4H_9)_4N)_2(MoO_{0.5}S_{3.5})$. This solution was used to impregnate to incipient wetness 167.0 g of the same 14/35 mesh calcined gamma alumina used in Example 1. The alumina was dried for 3 days in a vacuum desiccator. The impregnated alumina was then impregnated with a second solution of 56.0 g of tetrabutylammonium thiomolybdate, having essentially the same analyses, dissolved in enough methanol to give 140 ml of solution, and dried in a vacuum desiccator overnight. The 295.8 g of impregnated alumina so prepared contained 13.9 g weight percent $MoO_3$, on an ignition-loss free basis (ignition loss=36.43%).

Four equal portions of this impregnated alumina, with a combined weight of 197.0 g (240 ml), were thermally decomposed in fixed bed reactors at the same conditions described in Example 6. The portions of alumina were discharged in an inert atmosphere.

To make Catalyst H, three of these portions were recombined, yielding 94.85 g of solids material. This combined portion was impregnated with 13.56 g of cobalt nitrate dissolved in enough acetone to give 96 ml of solution, and dried for 4 days in a vacuum desiccator. The finished Catalyst H weighed 108.89 g, and contained 3.35 wt. % CoO and 13.52 wt. % $MoO_3$, on an ignition-loss free basis (ignition loss=13.93%). Catalyst H also contained 2.21 wt. % carbon and 5.12 wt. % sulfur, and had 189 m²/g surface area and 0.450 ml/g pore volume.

To make Catalyst J, the remaining portion of decomposed alumina supported thiomolybdate, weighing 31.52 g was impregnated with 4.55 g of nickel nitrate dissolved in enough acetone to give 32 ml of solution. The impregnated portion of alumina dried for 4 days in a vacuum desiccator. The finished Catalyst J weighed 36.00 g, and contained 3.70 wt. % NiO (based on recipe, not analysis) and 13.12 wt. % $MoO_3$, on an ignition-loss free basis (ignition loss=12.04%). The catalyst also contained 2.48 wt. % carbon and 4.94 wt. % sulfur. It had 186 m²/g surface area and 0.432 ml/g pore volume.

The catalysts activities were determined in side-by-side tests, along with both conventional Catalyst X and Catalyst Z. Per gram of molybdenum, conventional Catalyst X and Catalyst Z gave almost identical activities, both for desulfurization and for denitrogenation. This was expected because the only major difference between them is a higher overall metal level on Catalyst Z, which is compensated for by expressing the activities on a per gram of molybdenum basis. On the other hand, Catalyst H had only 0.78 times the desulfurization activity of the conventional catalysts, but 1.26 times the denitrogenation activity of the conventional catalysts. Catalyst J had 0.35 times the desulfurization activity of the conventional catalysts and 1.88 times the denitrogenation activity. Thus, the tendency for nickel promoted catalysts to be selective for HDN over HDS is manifested in the catalysts of this invention.

The hydrogen contents of the feed, liquid product, and off-gas from this particular activity test were very carefully measured, and the chemical hydrogen consumption of each catalyst was determined. Chemical hydrogen consumption is usually very closely correlated with nitrogen removal, since carbon-nitrogen bonds are stabilized by adjacent aromatic ring structures and are usually broken only after such aromatic rings have been hydrogenated. However, the relationship is more favorable for the catalysts of this invention than for conventional catalysts.

In hydrotreating a light cat cycle oil from a Baton Rouge refinery (FS-4754) to provide an 80 ppm nitrogen level in the liquid product, Catalyst H and J required only 625 SCF/B hydrogen consumption, while both conventional catalysts required 750 SCF/B. Hydrotreating to 20 ppm nitrogen, the chemical hydrogen consumptions were 725 and 850 SCF/B, respectively. Indeed, as shown in the attached FIGURE, at any given nitrogen level in the product both Catalyst H and J required the same hydrogen consumption, while both conventional catalysts required about 125 SCF/B more hydrogen. The accuracy of determination of the hydrogen consumption values is about 30 SCF/B. Thus, the catalyst of this invention can hydrotreat a given hydrocarbon feed to a given nitrogen target level with about a 125 SCF/B savings in hydrogen consumption, which represents a considerable cost savings. This reduction in hydrogen consumption is quite unexpected. The fact that both cobalt and nickel promoted Catalysts H and J show this advantage is quite significant, and demonstrates that it is a basic characteristic of supported amine thiomolybdate catalysts decomposed in a reducing, sulfiding environment.

It is apparent that various modifications and changes can be made without departing the spirit and scope of the present invention.

Having described the invention, what is claimed is:

1. A process for hydrotreating a hydrocarbon feed which comprises contacting said feed, in the presence of hydrogen, at hydrotreating conditions with a supported carbon-containing molybdenum sulfide and tungsten sulfide hydrotreating catalysts formed by the steps comprising compositing a preselected quantity of a porous, refractory inorganic oxide with a salt characterized by the formula

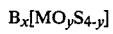

$B_x[MO_yS_{4-y}]$ where B is an organo or hydrocarbyl substituted diammonium ion, an organo or hydrocarbyl substituted ammonium ion or quaternary ammonium ion, or an ionic form of a cyclic amine containing one or more basic N atoms, x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms, M is molybdenum or tungsten, and y is 0, or a fraction or whole number ranging up to 3, and heat decomposing the salt of said catalyst precursor composite in the presence of a gaseous admixture consisting essentially of hydrogen and hydrogen sulfide to form said supported carbon-containing molybdenum sulfide or tungsten sulfide hydrotreating catalyst.

2. The process of claim 1 wherein the supported carbon-containing molybdenum or tungsten sulfide hydrotreating catalyst precursor composite, prior to decomposition of the salt, contains from about 5 percent to about 30 percent of the salt, calculated as $MoO_3$ or $WO_3$ on an ignition loss free basis.

3. The process of claim 2 wherein the catalyst precursor composite is heated at temperatures ranging from about 150° C. to about 400° C. to heat decompose the salt of said composite.

4. The process of claim 3 wherein the decomposition temperature ranges from about 200° C. to about 370° C.

5. The process of claim 2 wherein the decomposition temperature ranges from about 150° C. to about 400° C., and the salt impregnated catalyst precursor composite is contacted with the gaseous admixture containing hydrogen sulfide and hydrogen at a flow rate ranging from about 50 to about 5000 V/H/V, and at pressures ranging from about 0 to about 2000 psig.

6. The process of claim 5 wherein the flow rate of the gaseous admixture containing hydrogen sulfide and hydrogen ranges from about 100 to about 1000 V/H/V, the pressure ranges from about 0 to about 200 psig, and the concentration of hydrogen sulfide within the gaseous admixture ranges from about 0.5 percent to about 50 percent.

7. The process of claim 2 wherein the porous, refractory inorganic oxide is alumina.

8. The process of claim 2 wherein the porous, refractory inorganic oxide is particulate alumina, the salt is dissolved in a solvent, and the particulate alumina and salt solution are contacted together and the particulate alumina impregnated with the salt solution, the impregnated alumina is dried to remove the solvent, and the dry, salt-impregnated alumina heated to a temperature sufficient to decompose the salt and form said supported carbon-containing molybdenum sulfide or tungsten sulfide hydrotreating catalysts.

9. The process of claim 2 wherein, in the salt characterized by the formula $B_x[MO_yS_{4-y}]$, M is molybdenum and y ranges from 0 to 0.5.

10. The process of claim 2 wherein a group VIII metal or admixture of said metals, exclusive of said metal added by incorporation of said heat decomposable thiomolybdate or thiotungstate salt, is composited with said supported carbon-containing molybdenum sulfide or tungsten sulfide hydrotreating catalyst.

* * * * *